United States Patent
Herzberg

(10) Patent No.: US 9,156,498 B2
(45) Date of Patent: Oct. 13, 2015

(54) ROAD FINISHING MACHINE WITH MOBILE CONTROL PANEL

(71) Applicant: JOSEPH VOEGELE AG, Ludwigshafen/Rhein (DE)

(72) Inventor: Ingo Herzberg, Angelbachtal (DE)

(73) Assignee: JOSEPH VOEGELE AG (DE)

( * ) Notice: Subject to any disclaimer, the term of this patent is extended or adjusted under 35 U.S.C. 154(b) by 176 days.

(21) Appl. No.: 13/861,080

(22) Filed: Apr. 11, 2013

(65) Prior Publication Data

US 2013/0270866 A1    Oct. 17, 2013

(30) Foreign Application Priority Data

Apr. 12, 2012 (DE) .................... 20 2012 003 695 U

(51) Int. Cl.
*B62D 25/02* (2006.01)
*E01C 19/48* (2006.01)

(52) U.S. Cl.
CPC ............... *B62D 25/02* (2013.01); *E01C 19/48* (2013.01); *E01C 2301/30* (2013.01)

(58) Field of Classification Search
CPC ...... B62D 25/02; E01C 19/48; E01C 2301/30
USPC ......... 180/315, 326, 334; 404/83, 84.05, 118; 198/301, 322, 571, 860.1, 861.1
See application file for complete search history.

(56) References Cited

U.S. PATENT DOCUMENTS

| | | | |
|---|---|---|---|
| 4,861,191 A | | 8/1989 | Smith et al. |
| 6,026,920 A | * | 2/2000 | Obeda et al. ..................... 180/41 |
| 6,135,671 A | * | 10/2000 | Yasu et al. ..................... 404/108 |
| 6,446,747 B1 | * | 9/2002 | Muller et al. ................. 180/334 |
| 6,857,498 B2 | * | 2/2005 | Vitale et al. ................... 180/326 |
| 7,681,687 B2 | * | 3/2010 | Stander ......................... 180/334 |

FOREIGN PATENT DOCUMENTS

| | | |
|---|---|---|
| DE | 19513551 A1 | 11/1995 |
| DE | 29915965 U1 | 12/1999 |
| JP | 63172776 U | 11/1988 |
| JP | 198206 U | 6/1989 |
| JP | 2000045222 A | 2/2000 |
| JP | 2000272519 A | 10/2000 |
| JP | 2010132035 A | 6/2010 |

OTHER PUBLICATIONS

Japanese Office Action Dated Jun. 17, 2014, Application No. 2013-081808, dispatch No. 287189, 2 Pages.
Caterpillar: CAT AP300 Asphaltfertiger—HGHG3660 (Feb. 2008), 12 Pages.
German Search Report Dated Apr. 12, 2012, Applicant Joseph Voegele AG, Application No. 20 2012 003 695.5, 2 Pages.

* cited by examiner

*Primary Examiner* — Paul N Dickson
*Assistant Examiner* — Joselynn Y Sliteris
(74) *Attorney, Agent, or Firm* — Brooks Kushman P.C.

(57) ABSTRACT

A road finishing machine includes a control panel that can be moved between end positions on the left and right sides of the road finishing machine in a control platform. The control panel comprises a bearing roller fixed by means of a thrust bearing, and the bearing roller is engaged with a fixed bearing rail provided at the control platform.

10 Claims, 4 Drawing Sheets

ROAD FINISHING MACHINE WITH MOBILE CONTROL PANEL

CROSS-REFERENCE TO RELATED APPLICATIONS

This application claims foreign priority benefits under 35 U.S.C. §119(a)-(d) to German patent application number DE 20 2012 003 695.5, filed Apr. 12, 2012, which is incorporated by reference in its entirety.

TECHNICAL FIELD

The present disclosure relates to a road finishing machine with a control panel that can be moved between end positions on the left and right sides of the road finishing machine on a control platform.

BACKGROUND

Road finishing machines are construction machines that are employed in road construction to apply a surfacing layer onto the road. Here, it is in particular important that the operator of the road finishing machine can monitor the newly applied surfacing while it is being laid at the side and in the rear region of the road finishing machine. Therefore, usually seats are attached for the operator on the control platform on either side of the road finishing machine from which the operator can monitor the application of the surfacing on one side each. It is known in prior art to provide a control panel for each side and thus for each seat, so that altogether two control panels must be installed in the road finishing machine. However, this is a relatively complicated and cost-intensive solution, in particular if the control panel contains a plurality of displays and operational controls.

It was furthermore suggested in prior art to provide the control panel at a swivel arm, so that the control panel can be moved between the end positions in front of the respective seats by pivoting. It is furthermore known in prior art that the control panel is movable along a linear guide which extends essentially in the width direction of the road finishing machine, where a bearing on the linear guide is accomplished by means of sliding roller bearings and radial roller bearings which are attached to the bottom of the control platform or at the side of the control platform. This bearing, however, requires great shifting forces or a high break away torque for control panels of relatively high weight. Moreover, by means of these bearings, the clearance of the control panel with respect to the linear guide cannot be adjusted.

SUMMARY

It is an object of the present disclosure to provide a road finishing machine with an improved bearing of a mobile control panel.

This object is achieved by a road finishing machine with a control panel which can be moved between end positions on the left and right sides of the road finishing machine on a control platform, the control panel comprising a bearing roller fixed by means of a thrust bearing, the bearing roller being engaged with a fixed bearing rail provided at the control platform. In particular, the bearing roller is movably received in the fixed bearing rail. The bearing roller fixed by means of a thrust bearing can transmit forces also in its axial direction, that means in the direction of its axis of rotation, thus permitting a considerably more stable bearing.

Advantageously, the axial direction of the thrust bearing comprises at least one vertical component. Thereby, the weight of the control panel can be transmitted to the fixed bearing rail by the thrust bearing.

In one embodiment, the control panel is held in the fixed bearing rail by means of several bearing rollers, where the position of at least one of them can be adjusted to adjust the clearance of the bearing. In particular, the position of the at least one bearing roller can be adjusted in a direction orthogonal to its axial direction, so that it becomes engaged with an engagement region of the fixed bearing rail.

Advantageously, upper and lower bearing rails are provided in which at least one bearing roller is provided each, one bearing rail being embodied such that forces can be absorbed by the roller in two different orthogonal directions with respect to the extension direction of the rail, and the other bearing rail is embodied such that forces can be absorbed only in one direction orthogonal to the bearing rail. Thereby, the one bearing rail is embodied as a fixed bearing rail, while the other bearing rail is embodied as a floating bearing rail.

In particular, the upper bearing rail is the fixed bearing rail and comprises front and rear engagement regions for the at least one bearing roller which are each embodied essentially to be concave with respect to the bearing roller.

In particular, the lower bearing rail is embodied as a floating bearing rail and comprises front and rear engagement regions for the at least one bearing roller which are each arranged essentially in parallel to each other.

Advantageously, the upper bearing rail is designed to be open to the top. Thus, the bearing roller can be inserted into the upper bearing rail from above.

In particular, the lower bearing rail is designed to be open to the bottom. Thus, the lower bearing roller can be inserted into the lower bearing rail from the bottom.

Advantageously, the control panel has a control slide comprising an upper leg and a lower leg, where at least one bearing roller is fixed to the lower side of its upper leg, and at least one bearing roller is fixed to the upper side of its lower leg.

In particular, snap lock mechanisms are provided to secure the control panel in its right and left end positions.

An embodiment according to the disclosure will now be illustrated by way of example with reference to the attached drawings.

DETAILED DESCRIPTION

Figure 1:
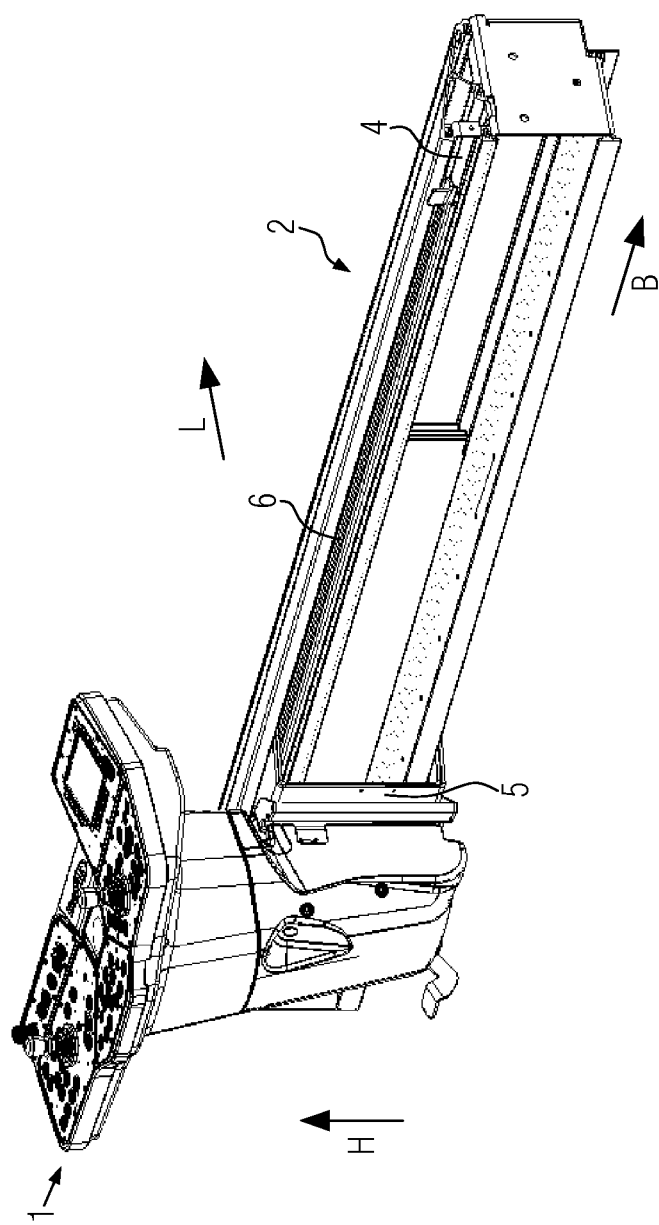
FIG. 1 shows a perspective view diagonally from the rear right onto the movable control panel which is held at a control panel bearing element of the control platform.

FIG. 1 shows a mobile control panel 1 and a control panel bearing element 2 for a road finishing machine according to the disclosure. The control panel bearing element 2 extends in the width direction B essentially over the complete width of the road finishing machine which is mainly moved in the longitudinal direction L during its operation. The control panel 1 can be linearly shifted along the control panel bearing element 2 essentially in the width direction B. In FIG. 1, the control panel 1 is shown in its left end position. In the left and right end positions, locking elements in the form of snap lock mechanisms 3, 4 are provided at the control panel bearing element 2 which permit a locking of the control panel 1 in its end positions. The control panel 1 has a plurality of control and display elements. Furthermore, the control panel has a control slide 5 by means of which it is movably held at the control panel bearing element 2.

Figure 3:
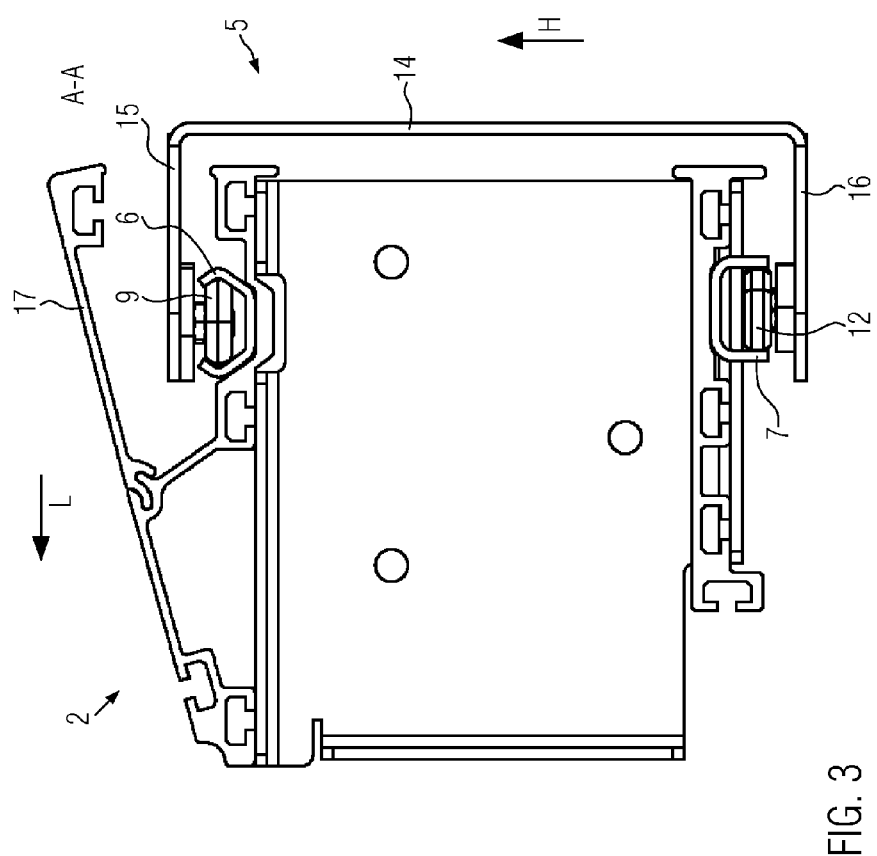
FIG. 3 shows a sectional view A-A of the control panel bearing element and the control slide without the control panel.
Figure 4:
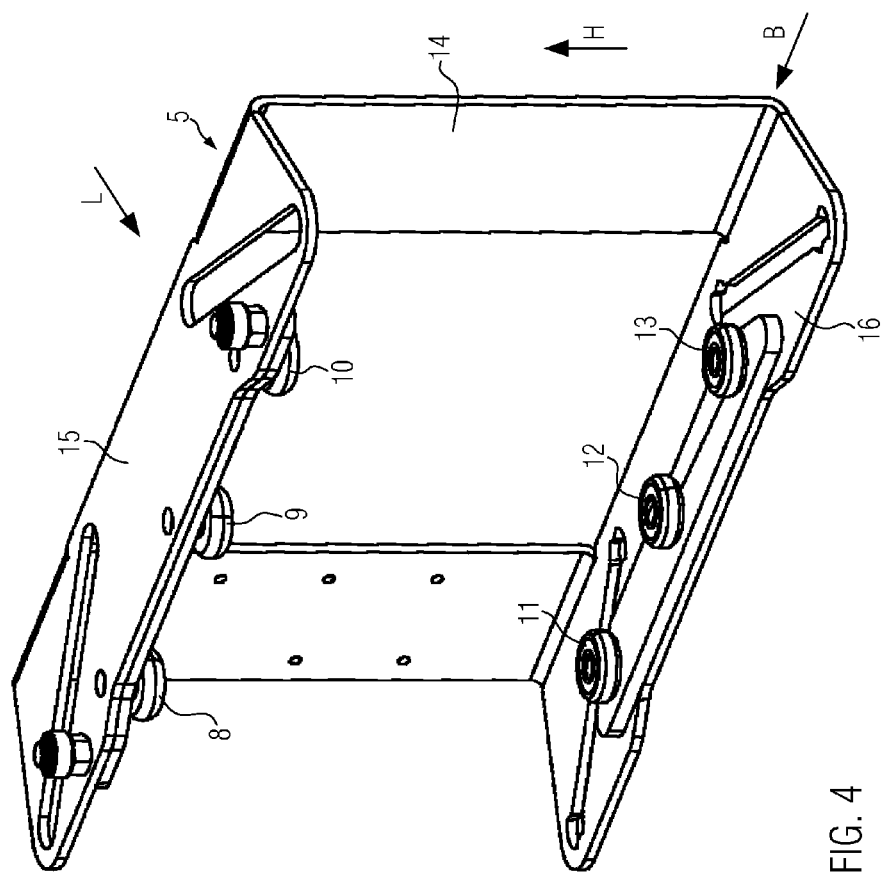
FIG. 4 shows a perspective view of the control slide.

The control panel bearing element 2 has an upper bearing rail 6 and a lower bearing rail 7 which are represented in the sectional view in FIG. 3. In the sectional view of FIG. 3, only the control slide 5 of the control panel 1 is represented.

Three upper bearing rollers 8, 9, 10 and three lower bearing rollers 11, 12, 13 are fixed each to the control slide 5, each of them being engaged with the upper bearing rail 6 and the lower bearing rail 7, respectively. For this, the control slide 5 has an essentially clamp-like shape with a central vertical region 14 which primarily extends in the vertical direction H, and upper and lower legs 15, 16 which each extend, starting from the central region 14, in the horizontal longitudinal direction L to the front. At the lower side of the upper leg, at least one of the upper bearing rollers 8, 9, 10 is attached by means of a thrust bearing, so that the vertical weight of the control panel 1 can be introduced into the upper bearing rail.

The bearing rollers 8, 9, 10, 11, 12, 13 are primarily disposed such that their axes of revolution extend in the vertical direction H. Advantageously, all upper bearing rollers 8, 9, 10 are held by means of thrust bearings. However, it should be pointed out that the respective thrust bearings can also absorb forces in radial directions which result, for example, from the moment caused by the eccentric bearing of the control panel 1.

The upper bearing rail 6 has, in its front and rear engagement regions in the longitudinal direction L, a concave design with respect to the upper bearing rollers 8, 9, 10, so that forces can also be transmitted to the upper bearing rail 6 in the vertical direction H. Thus, the upper bearing rail 6 forms a fixed bearing rail. The lower bearing rail 7 essentially comprises an engagement region for the lower bearing rollers 11, 12, 13 extending in the vertical direction H, so that the lower bearing rail can only absorb forces in the longitudinal direction L. In contrast, the upper bearing rail 6 can absorb forces in the longitudinal direction L and in the vertical direction H.

At least one of the upper bearing rollers 8, 9, 10 and/or the lower bearing rollers 11, 12, 13 can be adjusted, that means its position is adjustable. The position of the adjustable bearing roller is primarily adjustable in the longitudinal direction L, an adjustment in the vertical direction H also being possible. In particular, the central upper bearing roller 9 and/or the central lower bearing roller 12 are adjustable. Thus, the clearance of the bearing rollers 8, 9, 10; 11, 12, 13 in the respective rails 6, 7 can be adjusted by adjusting the adjustable bearing rollers 9, 12 with respect to the fixed bearing rollers 8, 10; 11, 13.

Figure 2:
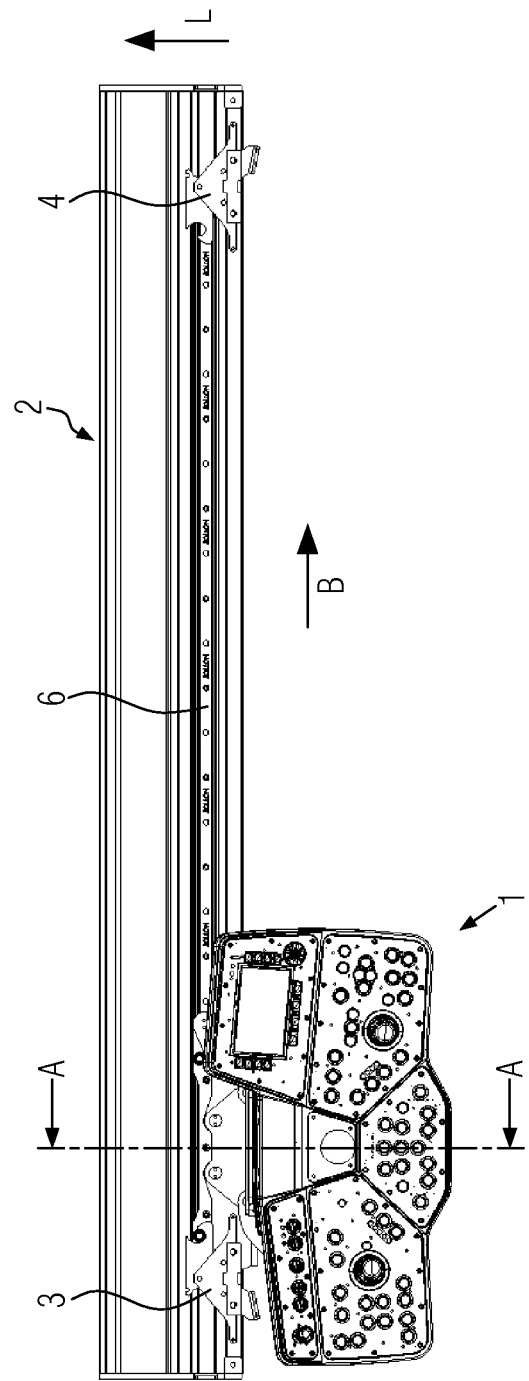
FIG. 2 shows a plan view from above onto the control panel and the control panel bearing element.

In particular, in the upper region of the control panel bearing element, a removable protective cover 17 can be provided which covers the upper bearing rail 6 and thus increases the safety of the operation of the device. The removable protective cover 17 is not represented in FIGS. 1 and 2.

The embodiment of the control panel bearing element and the control slide permit that primarily electric or hydraulic, possibly also pneumatic control lines can be advantageously carried along with the control slide as they can be arranged in or at the control panel bearing element in a suitable manner. Furthermore, the selection and positioning of the operational controls of the control slide can be effected according to the disclosure such that the accessibility and obviousness of operation are clearly improved.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road finishing machine comprising:
   a control platform;
   a fixed bearing rail provided at the control platform; and
   a control panel that can be moved between end positions on left and right sides of the control platform, wherein the control panel comprises a bearing roller attached by means of a thrust bearing, and the bearing roller is engaged with the fixed bearing rail.

2. The road finishing machine according to claim 1 wherein an axial direction of the thrust bearing comprises at least one vertical component.

3. The road finishing machine according to claim 1 wherein the control panel is held in the fixed bearing rail by several bearing rollers, and wherein position of at least one of the bearing rollers can be adjusted to adjust a clearance of the bearing rollers.

4. The road finishing machine according to claim 1 further comprising an additional bearing rail, and the control panel comprises an additional bearing roller received in the additional bearing rail, wherein one of the bearing rails is an upper rail and the other bearing rail is a lower rail, and wherein one bearing rail is embodied such that forces can be absorbed by the associated bearing roller in two orthogonal directions with respect to an extension direction of the rail, and the other bearing rail is embodied such that forces can be absorbed only in one direction orthogonal with respect to the bearing rail.

5. The road finishing machine according to claim 4 wherein the upper bearing rail comprises front and rear engagement regions for the associated bearing roller, each engagement region being designed to be essentially concave with respect to the bearing roller.

6. The road finishing machine according to claim 4 wherein the lower bearing rail comprises front and rear engagement regions for the associated bearing roller which are each arranged essentially in parallel with respect to each other.

7. The road finishing machine according to claim 4 wherein the upper bearing rail is designed to be open to the top.

8. The road finishing machine according to claim 4 wherein the lower bearing rail is designed to be open to the bottom.

9. The road finishing machine according claim 4 wherein the control panel comprises a control slide which comprises an upper leg and a lower leg, wherein one bearing roller is fixed to a bottom side of the upper leg, and the other bearing roller is fixed to an upper side of the lower leg.

10. The road finishing machine according to claim 1 further comprising snap lock mechanisms provided to secure the control panel in the right and left end positions.

* * * * *